Dec. 13, 1955      G. R. LA WALL      2,727,088
STRAIN RELIEF FOR ELECTRIC CORDS
Filed March 23, 1954
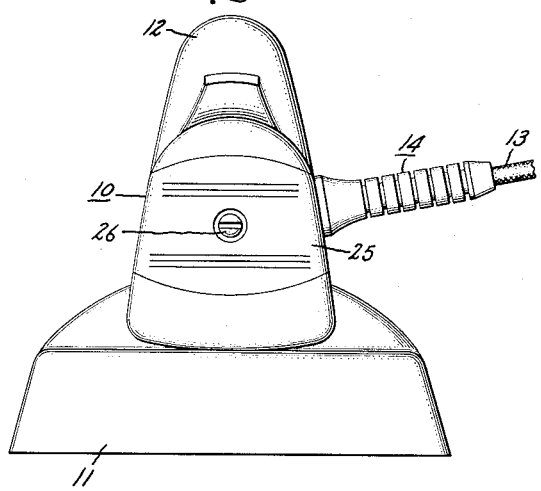
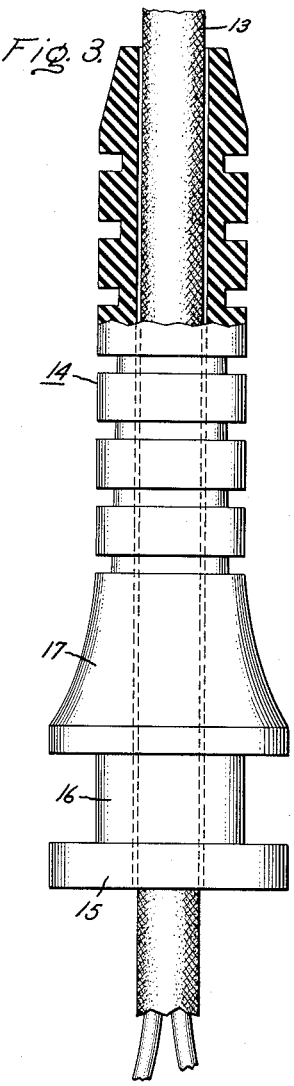
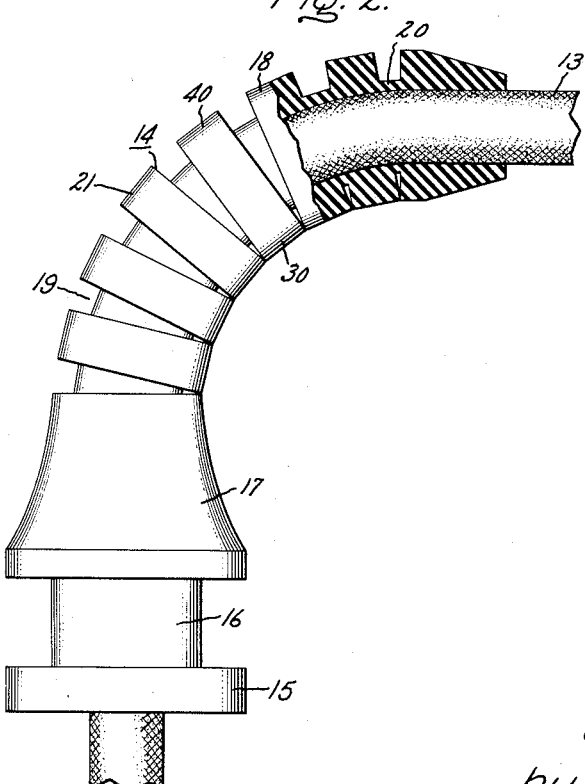
Inventor:
George R. LaWall,
by Richard L. Caslin
His Attorney.

United States Patent Office 2,727,088
Patented Dec. 13, 1955

2,727,088

STRAIN RELIEF FOR ELECTRIC CORDS

George R. La Wall, Trumbull, Conn., assignor to General Electric Company, a corporation of New York Application March 23, 1954, Serial No. 418,170

1 Claim. (Cl. 174—135)

The present invention relates broadly to a limit means formed as a series of longitudinally spaced discs on an electric cord to restrict the curvature of bending of the cord.

The present invention specifically relates to a resilient strain relief of molded rubber or thermoplastic construction which is mounted on an electric cord in order to increase the flexibility as well as the flex life of the cord in the area of maximum stress. This invention is particularly useful when incorporated with cords for small electrical appliances such as flat irons and portable electric mixers, as well as electric hand tools such as portable drills and saws.

The present invention, for illustration purposes, has been shown as it would be used on the heater cord of a flat iron, but it should be appreciated that its use is not limited to flat irons. In the operation of most flat irons of present day design the electric cord for supplying current to the iron is connected at its plug end to a convenience outlet usually situated in a wall of the room. The opposite end of the cord generally extends through an aperture in the rear portion of the handle of the iron to be semi-permanently connected by screw terminals or other means of connection to the heater unit of the iron.

An elongated strain relief member is fixed within the same cord-receiving aperture in the handle to project outwardly and enclose the cord as a reinforcing means where it extends into the handle structure. Coiled springs were once used for this purpose but in recent years they have been generally replaced by molded sleeves of rubber or thermoplastic materials. These sleeves have been of tubular cross-section and they have often been tapered with the thickest portion located adjacent the iron. The difficulty with most of these molded sleeves has been that they were either too rigid adjacent the outer end thereof, which shifted the maximum point of stress to where the cord entered the strain relief or, secondly, they were too flexible so that they did not properly reinforce the cord in the area adjacent the handle of the iron.

Accordingly, the principal object of this invention is to provide an improved limit means for an electric cord to prevent the excessive bending of an end of the cord as well as to increase the flexibility and the flex life of the cord.

A further object of this invention is to provide an electric cord with a strain relief means which has high initial flexibility but which will become more rigid as it approaches the shape of the arc of a quarter-circle.

A further object is to provide a strain relief means with a series of longitudinally spaced circular grooves extending substantially the entire length thereof.

A further object is to provide an electric cord with a series of longitudinally spaced annular discs of resilient or rigid material which are so spaced that when the cord is bent the discs are brought into engagement with each other in successive order to limit the curvature of bending of the cord.

A still further object is to provide a strain relief means with the ability to resist sharp angle bends in an electric cord while at the same time providing sufficient flexibility to prevent the rupture of the cord in the area where the cord enters the strain relief means.

The present invention, as herein described, is embodied in a strain relief for an electric cord of molded rubber or thermoplastic insulating material which may either be molded onto the cord; or alternatively, pre-molded as a sleeve to be slid onto the cord. This strain relief comprises two portions, an enlarged portion at one end for engagement in an aperture provided in the iron and a resilient tubular portion having a series of longitudinally spaced circular grooves extending from one end of the strain relief to the other enlarged end portion. The purpose of the series of circular grooves is to weaken the strain relief so that it has high initial flexibility. As the cord is bent it conforms naturally to the shape of an arc of a circle. This fact will be appreciated when it is understood that on the compression side of the strain relief, considered when the cord is bent, the grooves tend to close until spaced points on opposite sides of the grooves come in contact with each other. At the same time, on the tension side of the strain relief the grooves will be enlarged. When some or all of the grooves are closed the strain relief is appreciably more rigid so as to prevent the formation of hairpin turns in the cord. Therefore, it can readily be seen that by utilizing this invention an electric cord will be virtually limited in its natural bending to an arc of a quarter-circle, that is to a curvature of approximately 90°, in the area adjacent the strain relief, which will afford complete protection against the destructive fatigue stresses that have heretofore resulted in the failure of electric cords that have not been provided with the proper strain relief means.

My invention will be better understood from the following description taken in connection with the accompanying drawing, and its scope will be pointed out in the appended claim.

In the drawing:

Fig. 1 is a rear end elevational view of a flat iron provided with an electric cord embodying my invention.

Fig. 2 is a view partly in section showing a short length of electric cord having molded thereto the strain relief embodying my invention and illustrating the action of the strain relief as the cord is bent.

Fig. 3 is a view similar to Fig. 2, but showing a pre-molded strain relief that is not molded as part of the cord but is merely slipped on the cord.

Referring in detail to Fig. 1 of the drawing, 10 represents an electric flat iron of conventional design comprising a sole plate 11 and handle 12. One end of an electric cord 13 extends through an aperture in the handle 12 to be electrically connected to the heater unit of the iron. This connection has not been illustrated for it is not relevent to the present invention. The invention herein resides in a strain relief 14 of molded rubber or thermoplastic material. Fig. 2 of the drawing shows the strain relief 14 as being molded onto the cord 13; while in Fig. 3, the strain relief is pre-molded so that it is merely slipped over the cord and is relatively movable therewith. It should be appreciated, however, that other means may be devised for attaching the strain relief to the cord as, for example, by cementing the two together.

The end of the strain relief which is to be secured in the aperture (not shown) of the handle of the iron is of relatively heavy construction and consists of flange member 15, a plug portion 16 and a shoulder portion 17. The plug portion 16 is of generally the cross-sectional shape of the aperture in the handle of the iron while the spacing between the flange 15 and the shoulder 17 is about equal to the wall thickness of the handle surrounding the aperture. As is well known in the art, in inserting a strain relief of this nature in the aperture it is necessary to remove the part 25 of the handle, thereby exposing or removing the side of the aperture so that the plug portion 16 may be slipped into the aperture. When the part 25 is again mounted on the handle 12 and fastened by means of the screw 26, it is clear that the flange 15 and the shoulder 17 would resist any force tending to remove the strain relief from the aperture. This mode of connecting the strain relief to the handle is well known in this art and it does not represent part of my invention. The improvement herein lies in the resilient tubular portion 18 of the strain relief which comprises a series of longitudinally spaced grooves 19 formed therein and extending from the enlarged shoulder portion 17 to the opposite end of the strain relief. The grooves 19 are deep cut to leave only a thin-walled tube section 20 joining the resulting annular discs 21.

It is an important principle of this invention that strain relief should have maximum initial flexibility as a cord is bent from a straight-line position. As the cord approaches a right angle bend position the strain relief should become increasingly rigid to prevent, or to strongly resist, the formation of sharp bends in the cord. It is also a feature of this design that as the cord is bent the compression side of the strain relief will foreshorten, thereby closing the grooves 19 between the annular discs 21 while on the tension side of the strain relief the grooves 19 will be enlarged as may be clearly seen in Fig. 2. When the cord is in a straight-line position as is shown in Fig. 1 the discs 21 of the strain relief are equally spaced from each other or conversely the grooves 19 are of constant width. As the cord 13 is bent, the discs 21 are moved by the cord with the compression side of the strain relief being nearest the center of curvature of the cord and the tension side of the strain relief being opposite from the compression side. Looking at Fig. 2, 30 represents the compression side of the strain relief and 40 the tension side. In Fig. 2, as the cord is bent, the lowermost disc 21 will be tilted until it strikes against the shoulder 17, thereby closing the grooves 19 therebetween. As the bending action continues, the discs 21, starting with the first-mentioned disc, will come to rest against the adjacent lower disc until the cord has been bent through a 90° angle when all the discs will be in contact along the compression side of the strain relief. At this time the bend in the cord will have naturally assumed a near perfect arc of a quarter-circle.

Turning to Fig. 3 of the drawing, strain relief 14 is the same as is shown in Fig. 2 except that it is pre-molded so that it can be slipped over the electric cord and then attached in the aperture in the handle of the iron. With this configuration it is possible to obtain a limited amount of relative movement between the cord and the strain relief as the cord is bent, thereby allowing for greater flexibility.

Consequently, having described my invention of a novel strain relief for an electric cord, it will be readily apparent to those skilled in this art that this strain relief is highly flexible as the cord is bent from zero to 90 degrees, but that its resistance to bending increases rapidly when, on the compression side of the strain relief, the annular discs begin to engage each other and are put under compression to react against the further bending of the cord. Thus, I have not only provided a strain relief having high flexibility, but I have increased the flex life of the cord in the area adjacent the strain relief wherein the highest breaking stresses would be concentrated.

While I have chosen to illustrate the present invention as being incorporated in an electric cord for a flat iron, it should be well understood that as an alternative it could be used on a portable cordset which is readily detachable from a flat iron or electric grill or other appliance. Also, it is quite possible to utilize the present invention by molding or otherwise affixing onto an electric cord a series of longitudinally spaced discs having no interconnection other than the cord itself. These discs could be made of rubber or thermoplastic material, or conceivably of a rigid material such as metal or wood as long as it were possible to permanently fix the discs on the cord.

I have illustrated my invention as being embodied in a tubular portion 18 of uniform diameter having grooves 19, tube sections 20 and discs 21 of equal size; but, it should be readily apparent that greater flexibility could be had in the free end of portion 18 by decreasing the thickness of the tube sections 20 in gradual steps from the shoulder 17 to the free end of the strain relief. If this change were made the natural bend in the cord would probably be in the shape of a portion of a cycloidal curve rather than as the arc of a quarter-circle. Other modifications will be suggested by this disclosure to those skilled in this art such as tapering down the diameter of the discs 21 toward the free end of the tubular portion 18. Also, it is conceivable under certain circumstances that it might be advantageous to reduce the width of the grooves 19 in uniform steps starting from the shoulder 17 to the free end of the relief 14.

Modifications of this invention will occur to those skilled in this art, and it is to be understood, therefore, that this invention is not limited to the particular embodiment disclosed, but that it is intended to cover all modifications which are within the true spirit and scope of this invention.

What I claim as new and desire to secure by Letters Patent of the United States is:

A strain relief member for electric cords comprising an elongated tube of resilient material through which said cord extends, the tube being provided with a series of longitudinally spaced circular grooves, the width of each individual groove being substantially constant throughout the entire depth of the groove so as to form spaced annular discs which are joined by thin walled sections, the diameter and spacing of said annular discs are such that said discs engage each other along the compression side of the strain relief member when the cord is bent to a curvature of approximately 90°, thus limiting the bending to said curvature of approximately 90°.

References Cited in the file of this patent

UNITED STATES PATENTS 836,882    Hoffman _____ Nov. 27, 1906

FOREIGN PATENTS 447,173    Italy _____ Apr. 4, 1949